United States Patent
Schäfer

(10) Patent No.: US 9,982,588 B2
(45) Date of Patent: May 29, 2018

(54) PRE-COMBUSTION CHAMBER ASSEMBLY FOR INTERNAL COMBUSTION ENGINES

(71) Applicant: Caterpillar Energy Solutions GmbH, Mannheim (DE)

(72) Inventor: Friedrich Schäfer, Edenkoben (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 20 days.

(21) Appl. No.: 15/355,750

(22) Filed: Nov. 18, 2016

(65) Prior Publication Data
US 2017/0145898 A1 May 25, 2017

(30) Foreign Application Priority Data
Nov. 25, 2015 (EP) .................................. 15196302

(51) Int. Cl.
| | |
|---|---|
| F02P 23/00 | (2006.01) |
| F02B 19/12 | (2006.01) |
| F02F 1/24 | (2006.01) |
| F02P 13/00 | (2006.01) |
| H01T 13/32 | (2006.01) |

(Continued)

(52) U.S. Cl.
CPC ............... *F02B 19/12* (2013.01); *F02F 1/24* (2013.01); *F02P 13/00* (2013.01); *H01T 13/32* (2013.01); *H01T 13/467* (2013.01); *H01T 13/54* (2013.01); *F02D 19/02* (2013.01); *H01T 13/39* (2013.01); *Y02T 10/125* (2013.01)

(58) Field of Classification Search
CPC .......... F02P 13/00; F02P 15/00; H01T 13/20; H01T 13/32; H01T 13/39; F02B 19/12; F02B 19/04

USPC ............ 123/143 R, 169 R, 169 EL, 260, 265
See application file for complete search history.

(56) References Cited

U.S. PATENT DOCUMENTS

| | | | |
|---|---|---|---|
| 3,517,247 | A | 6/1970 | Szilagyi |
| 4,452,189 | A | 6/1984 | Latsch et al. |

(Continued)

FOREIGN PATENT DOCUMENTS

| | | |
|---|---|---|
| DE | 3025926 | 2/1982 |
| DE | 19819197 | 1/1999 |

(Continued)

OTHER PUBLICATIONS

European Search Report for Application No. 15196302.2 dated Jun. 2, 2016, (2 pages).

*Primary Examiner* — John Kwon

(57) ABSTRACT

A pre-chamber assembly for an internal combustion engine is disclosed. The pre-chamber assembly may have a pre-chamber main body configured to be mounted to the internal combustion engine and defining at least a portion of a pre-chamber extending along a longitudinal axis. The pre-chamber assembly may also have an ignition electrode. The ignition electrode may have a center electrode and at least one electrode arm extending from the center electrode at least partially into the pre-chamber. The at least one electrode arm may extend in both a radial direction with respect to the longitudinal axis and an axial direction with respect to the longitudinal axis. Additionally, the pre-chamber assembly may have a mass element including at least one radial inner face facing the at least one electrode arm. The at least one radial inner face may be non-parallel with respect to the longitudinal axis.

20 Claims, 4 Drawing Sheets

(51) Int. Cl.
*H01T 13/46* (2006.01)
*H01T 13/54* (2006.01)
*F02D 19/02* (2006.01)
*H01T 13/39* (2006.01)

(56) References Cited

U.S. PATENT DOCUMENTS

| | | | |
|---|---|---|---|
| 5,952,770 A | 9/1999 | Mueller et al. | |
| 6,091,185 A | 7/2000 | Matsubara et al. | |
| 7,513,234 B1* | 4/2009 | Baldwin | H01T 13/26 |
| | | | 123/169 EA |
| 7,714,489 B2 | 5/2010 | Torii et al. | |
| 8,839,762 B1* | 9/2014 | Chiera | F02B 19/108 |
| | | | 123/256 |
| 8,890,396 B2* | 11/2014 | Ernst | H01T 13/54 |
| | | | 313/140 |
| 9,843,165 B2* | 12/2017 | Chiera | H01T 13/06 |
| 2005/0211217 A1 | 9/2005 | Boley et al. | |
| 2013/0206122 A1* | 8/2013 | Chiera | H01T 13/54 |
| | | | 123/594 |
| 2014/0196684 A1* | 7/2014 | Kraus | H01T 13/20 |
| | | | 123/253 |
| 2015/0040845 A1* | 2/2015 | Chiera | F02B 19/108 |
| | | | 123/41.32 |
| 2016/0053673 A1* | 2/2016 | Sotiropoulou | F02B 19/18 |
| | | | 123/260 |
| 2017/0167358 A1* | 6/2017 | Maier | F02B 19/1019 |

FOREIGN PATENT DOCUMENTS

| | | |
|---|---|---|
| EP | 1476926 | 6/2006 |
| WO | WO 2008/031482 | 3/2008 |
| WO | WO 2011/031991 | 3/2011 |
| WO | WO 2013/120632 | 8/2013 |
| WO | WO 2014/094808 | 6/2014 |
| WO | WO 2014/177169 | 11/2014 |

* cited by examiner

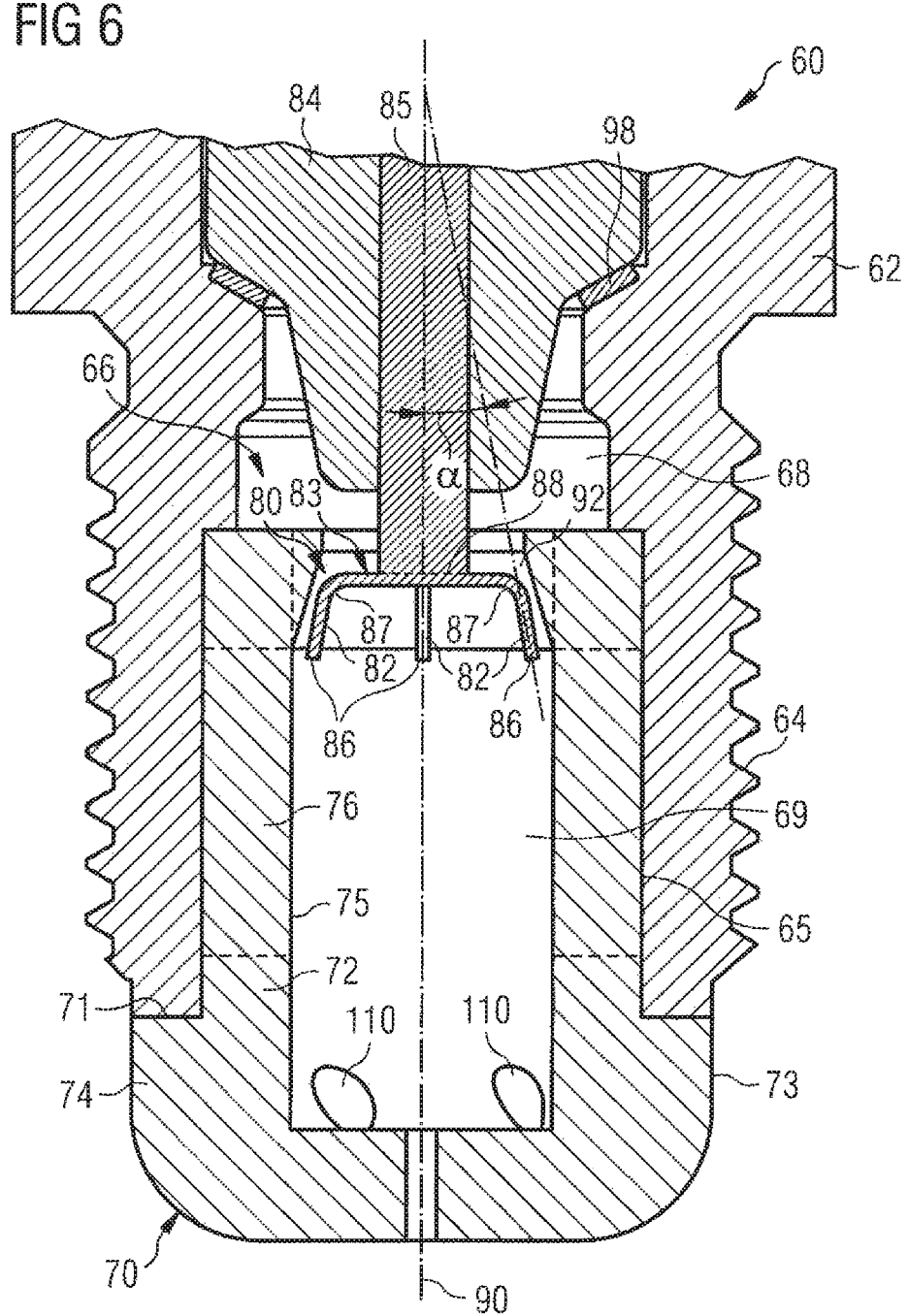

PRE-COMBUSTION CHAMBER ASSEMBLY FOR INTERNAL COMBUSTION ENGINES

CLAIM FOR PRIORITY

This application claims benefit of priority of European Patent Application No. 15196302.2, filed Nov. 25, 2015, which is incorporated herein by reference.

TECHNICAL FIELD

The present disclosure relates to a pre-combustion chamber assembly for internal combustion engines, and particularly to a pre-combustion chamber assembly including an ignition electrode and utilized in gaseous fuel internal combustion engines.

BACKGROUND

It is known to employ a spark ignited pre-combustion chamber assembly (in the following referred to as "pre-chamber assembly) including a pre-combustion chamber (in the following referred to as "pre-chamber") in some internal combustion engine applications, such as gaseous fuel applications. Typically, a pre-chamber is a relatively small gas accumulating chamber located in the pre-chamber assembly or in the engine cylinder head. The pre-chamber is in fluid communication with the main combustion chamber of the internal combustion engine via a number of small flow channels. During operation, an ignition electrode generates a spark for igniting a mixture of gaseous fuel and air within the pre-chamber (as opposed to igniting the gaseous fuel in the main combustion chamber). Ignition of the gaseous fuel in the pre-chamber generates a front of burning fuel which is jetted or otherwise advanced through the flow channels into the main combustion chamber thereby igniting the mixture of gaseous fuel and air therein.

It is further known to provide the ignition electrode in a crucial shape. In such case, the ignition electrode may include a plurality of electrode arms extending substantially upright from a connecting section into the interior of the pre-chamber.

In the prior art, the manufacturing process of the ignition electrode may include some mechanical manufacturing steps including, for example, cutting a crucial piece out of a metal sheet, bending each electrode arms into the desired shape, and applying a metal coat, such as, for instance, an iridium coat to the bended ignition electrode. However, the mechanical bending process may be limited due to, for example, the material's yield strength and, during operation of the ignition electrode, the electrode arms may break as the bending radius were selected too small for the used material and used material thickness.

US 2014/0196684 A1 discloses a spark plug for an internal combustion engine, in particular a gas engine. The spark plug includes a center electrode and at least one earth electrode group, each comprising one or more earth electrode platelets. The center electrode includes at least one center electrode platelet having a center electrode surface, and the center electrode surface is inclined in a range from 0° to 50°, preferably at most 45°, to a cross-sectional plane transverse to the longitudinal axis of the spark plug. Each earth electrode platelet of an earth electrode group has an earth electrode surface facing towards the center electrode surface, spaced apart from the earth electrode surface and running substantially parallel to the earth electrode surface.

A pre-chambered type spark plug with pre-chamber entirely below a bottom surface of a cylinder head is known from US 2005/0211217 A1.

The present disclosure is directed, at least in part, to improving or overcoming one or more aspects of prior systems.

SUMMARY OF THE DISCLOSURE

According to the present disclosure, a pre-chamber assembly for an internal combustion engine may comprise a pre-chamber main body configured to be mounted to the internal combustion engine and defining at least a portion of a pre-chamber extending along a longitudinal axis, and an ignition electrode including a center electrode and at least one electrode arm extending from the center electrode at least partially into the pre-chamber. The at least one electrode arm may extend in both at least a radial direction with respect to the longitudinal axis and at least an axial direction with respect to the longitudinal axis. The disclosed pre-chamber assembly may further comprise a mass element including at least one radial inner face facing the at least one electrode arm. The at least one radial inner face may be substantially non-parallel with respect to the longitudinal axis.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 6 is a cut view of a further exemplary disclosed pre-chamber assembly

DETAILED DESCRIPTION

Figure 1:
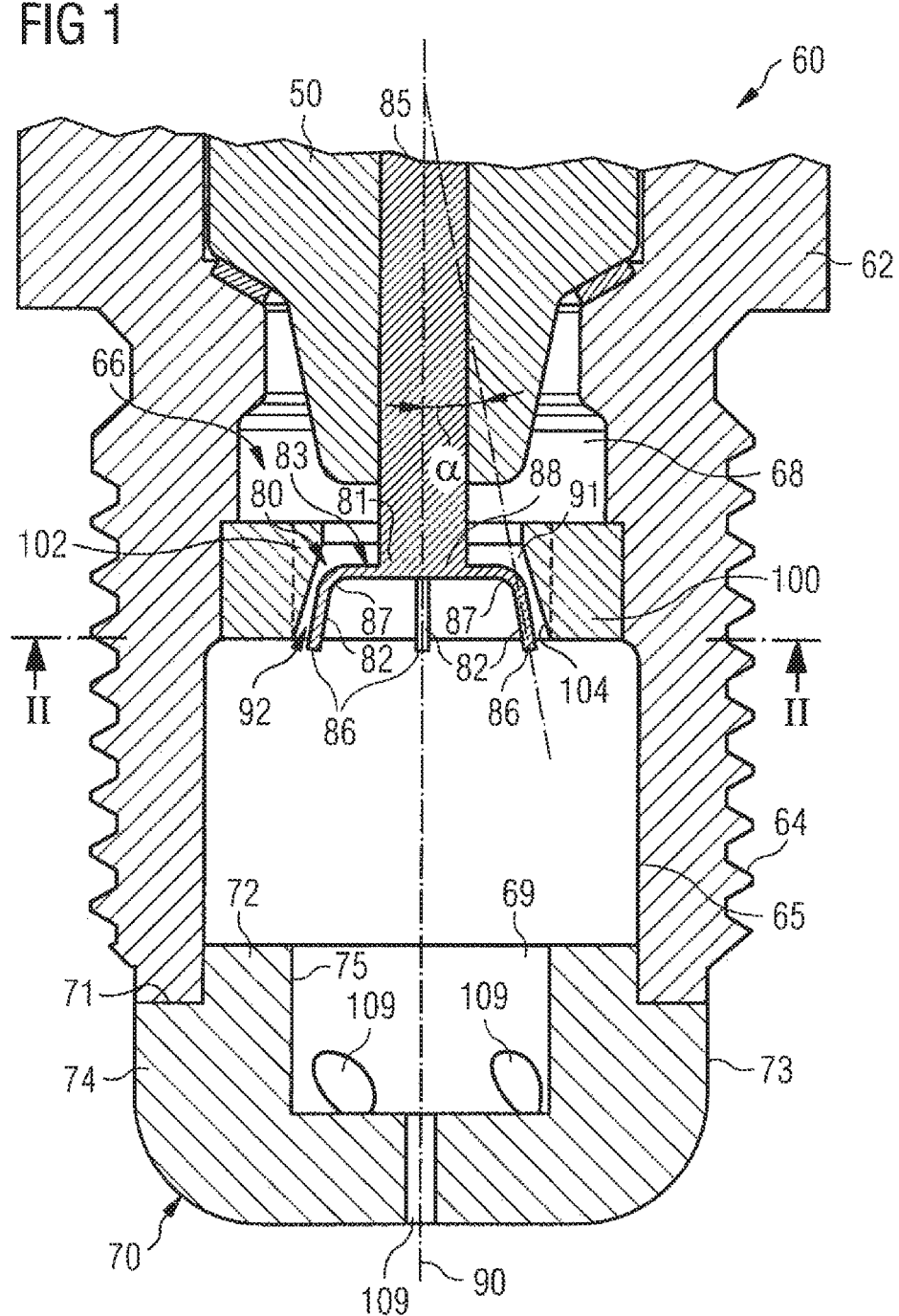
FIG. 1 is a cut view of an exemplary disclosed pre-chamber assembly including a mass element.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

Within the meaning of the present disclosure, substantially correspondence of the radial inner face of the mass element and the electrode arm means that the radial inner face of the mass element and the electrode arm both have a substantially similar inclination with respect to the longitudinal axis. Specifically, the directions of the inclinations of the radial inner face of the mass element and the electrode arm are substantially similar when seen in a sectional plane extending through the longitudinal axis.

Further, within the meaning of the present disclosure, non-parallelism between the longitudinal axis and the radial inner face of the mass element means that the radial inner face of the mass element is at least partially inclined to a cross-sectional plane including the longitudinal axis of the pre-chamber.

The present disclosure may be based at least in part on the realization that providing a mass element forming a ground electrode of a spark ignited pre-chamber assembly, wherein the mass element has a radial inner face substantially corresponding to the outer shape of an associated electrode arm of an ignition electrode, may provide defined locations where a spark is generated for reliably igniting an air-fuel-mixture in an internal combustion engine.

The present disclosure may be further based at least in part on the realization that forming the ignition electrode out of, for instance, a noble metal such as Iridium, Platinum, Osmium, or any alloys thereof, may lead to less wear of the ignition electrode and, thus, may enhance the lifetime of the pre-chamber assembly.

The present disclosure may be further based at least in part on the realization that providing the mass element with mass protrusions substantially following the outer shape of associated electrode arms may lead to a more uniform wear at both the mass protrusion and the associated electrode arm during operation of the pre-chamber assembly.

In the course of development, it has been found out that, for example, Iridium as a material for the electrode arms may have higher melting point than, for example, Platinum. In such case, however, wear of the electrode and/or electrode arms may be less than wear of the corresponding mass element which may be usually formed out of, for instance, a Nickel alloy. Therefore, higher wear of the mass element may lead to material recesses and, thus, would increase a spark gap between the mass element and the electrode arm made of, for example, Iridium. When exceeding a predetermined threshold, proper generation of a spark between the mass element and the electrode arm made of Iridium may no longer be ensured. The exemplary disclosed pre-chamber assembly may overcome said drawbacks.

Referring now to the drawings, an exemplary embodiment of a pre-chamber assembly 60 used in an internal combustion engine, such as, for instance, a gaseous fuel internal combustion engine, for supporting a combustion event within main combustion chambers (not shown) of the internal combustion engine is illustrated in FIG. 1. Although the present pre-chamber assembly 60 is described with respect to a gaseous fuel internal combustion engine, the exemplary disclosed pre-chamber assembly 60 may be used in connection with any internal combustion engine requiring a device supporting in igniting an air-fuel-mixture with the main combustion chambers.

As shown in FIG. 1, the pre-chamber assembly 60 includes a pre-combustion chamber main body (in the following referred to as "pre-chamber main body) 62 and a pre-combustion chamber cap (in the following referred to as "pre-chamber cap) 70 attached to the pre-chamber main body 62. The pre-chamber main body 62 includes a threaded portion 64 configured to engage with a threaded portion of a cylinder head of the internal combustion engine.

Both the pre-chamber main body 62 and the pre-chamber cap 70 may be formed by casting. In an exemplary embodiment, the pre-chamber main body 62 and the pre-chamber cap 70 may be formed by, for instance, casting and may consist of a material having a high thermal and mechanical stress resistance, such as, for example, a chrome-nickel alloy.

The pre-chamber main body 62 and the pre-chamber cap 70 are disposed about a longitudinal axis 90 and include a substantially cylindrical cross-section. The pre-chamber main body 62 defines a first portion 68 of a pre-chamber 66. The pre-chamber cap 70 defines a second portion 69 of the pre-chamber 66. The first portion 68 and the second portion 69 are in fluid communication with each other.

An ignition electrode 80 may extend along the longitudinal axis 90 and includes a center electrode 85 having a center electrode end 81 protruding at least partially into the first portion 68 of the pre-chamber 66. The ignition electrode 80 further includes at least one electrode arm 82 extending from the center electrode end 81 in both at least a radial direction with respect to the longitudinal axis 90 and an axial direction with respect to the longitudinal axis 90. That is the at least one electrode arm 82 has a component extending in the radial direction with respect to the longitudinal axis 90 and a component extending in the axial direction with respect to the longitudinal axis 90. The at least one electrode arm 82 includes a distal end portion 86 and a proximal end portion 87 configured to be attached to a connecting section 88 that is attached to the center electrode 85 via, for instance, welding. In some embodiments, the electrode arms 82 may be integrally formed with the center electrode 85.

In some embodiments, instead of providing electrode arms 82, the center electrode 85 may be provided with at least one electrode pin, at least one protruding electrode peak, and/or at least one electrode protrusion.

The pre-chamber assembly 60 may further include a mass element 100 mounted to the pre-chamber main body 62, such that the mass element 100 circumferentially extends about the electrode arms 82. The mass element 100 includes at least one radial inner face 104 facing the at least one electrode arm 82. In the exemplary disclosed embodiment of FIG. 1, as indicated in two-dot-dashed lines in FIG. 1, the mass element 100 includes a plurality of mass protrusions 102 each extending radially inward towards an associated electrode arm 82. In the example shown in FIG. 1, the ignition electrode 80 includes four electrode arms 82. Thus, the mass element 100 includes four mass protrusions 102 each associated with one of the electrode arms 82. However, in some further embodiments, the number of electrode arms 82 and the number of mass protrusions 102 may be unequal four, such as, for instance, one two, three, or more than four. In some further embodiments, the number of electrode arms 82 may not correspond to the number of mass protrusions 102. For instance, there may be more or less electrode arms 82 than mass protrusions 102. For example, there may be two electrode arms 82 associated with a common mass protrusion 102.

The mass element 100 forms a ground electrode for the ignition electrode 80. The ignition electrode 80 is electrically connected to an engine control unit (not shown) and may be configured to generate a spark between the electrode arms 82 and the associated mass protrusion 102 upon an electric signal provided by the engine control unit via the center electrode 85.

As indicated in FIG. 1, the electrode arms 82 which may form a unit are connected via, for instance, a weld 83 to the center electrode 85. The center electrode 85 is supported by an insulator 50, such as, for example, a ceramic insulator. For example, the weld 83 may be a laser beam weld, a friction weld, an electronic beam weld, or any other weld suitable for attaching the electrode arms 82 to the center electrode 85.

The pre-chamber cap 70 comprises a connecting portion 72 and a nozzle portion 74. The connecting portion 72 is configured to be inserted into a receiving portion 65 of the pre-chamber main body 62. As shown in FIG. 1, the connecting portion 72 and the receiving portion 65 have a cylindrical shape substantially corresponding to one another, such that the connecting portion 72 of the pre-chamber cap 70 at least partially form-fits into the receiving portion 65 of the pre-chamber main body 62.

The pre-chamber cap 70 is fixedly attached to the pre-chamber main body 62 by means of welding, such as, for example, laser beam welding. It is understood that the beam weld circumferentially extends around the entire flange formed between the bottom end of the pre-chamber main body 62 and a shoulder 71 of the nozzle portion 74 of the pre-chamber cap 70.

As further indicated in FIG. 1, the pre-chamber cap 70 comprises an inner surface 75 forming the second portion 69 of the pre-chamber 66. The inner surface 75 includes a bottom portion having a generally convex funnel-like shape.

The pre-chamber cap 70 includes an outer surface 73 configured to at least partially extend into a main combustion chamber of the internal combustion engine. The pre-chamber cap 70 includes at least one flow channel 109 disposed at the nozzle portion 74. Specifically, the at least one flow channel 109 is configured to fluidly connect the pre-chamber 66 with an associated main combustion chamber. It is further preferred that the at least one flow channel 109 fluidly connects the pre-chamber 66 at the bottom portion with the associated main combustion chamber.

As further illustrated in FIG. 1, each electrode arm 82 includes a longitudinal axis 91 forming an angle α with respect to the longitudinal axis 90. The angle α may range from about 1° to about 20°, such that the distal end portion 86 of each electrode arm 82 is farther away from the longitudinal axis than the proximal end portion 87 of the electrode arm 82. In such case, it may be ensured that the spark may be generated at the spark gap 92 between the distal end portion 86 and the mass protrusion 102, which results in that the electrode arm 82 is worn in a direction from the distal end portion 86 to the proximal end portion 87. Thus, falling off of the electrode arm 82 from the connecting section 88 may be prevented. It should be noted that, in some embodiments, the electrode arms 82 may include any other suitable shape, such that, for example, a bent shape.

Figure 2:
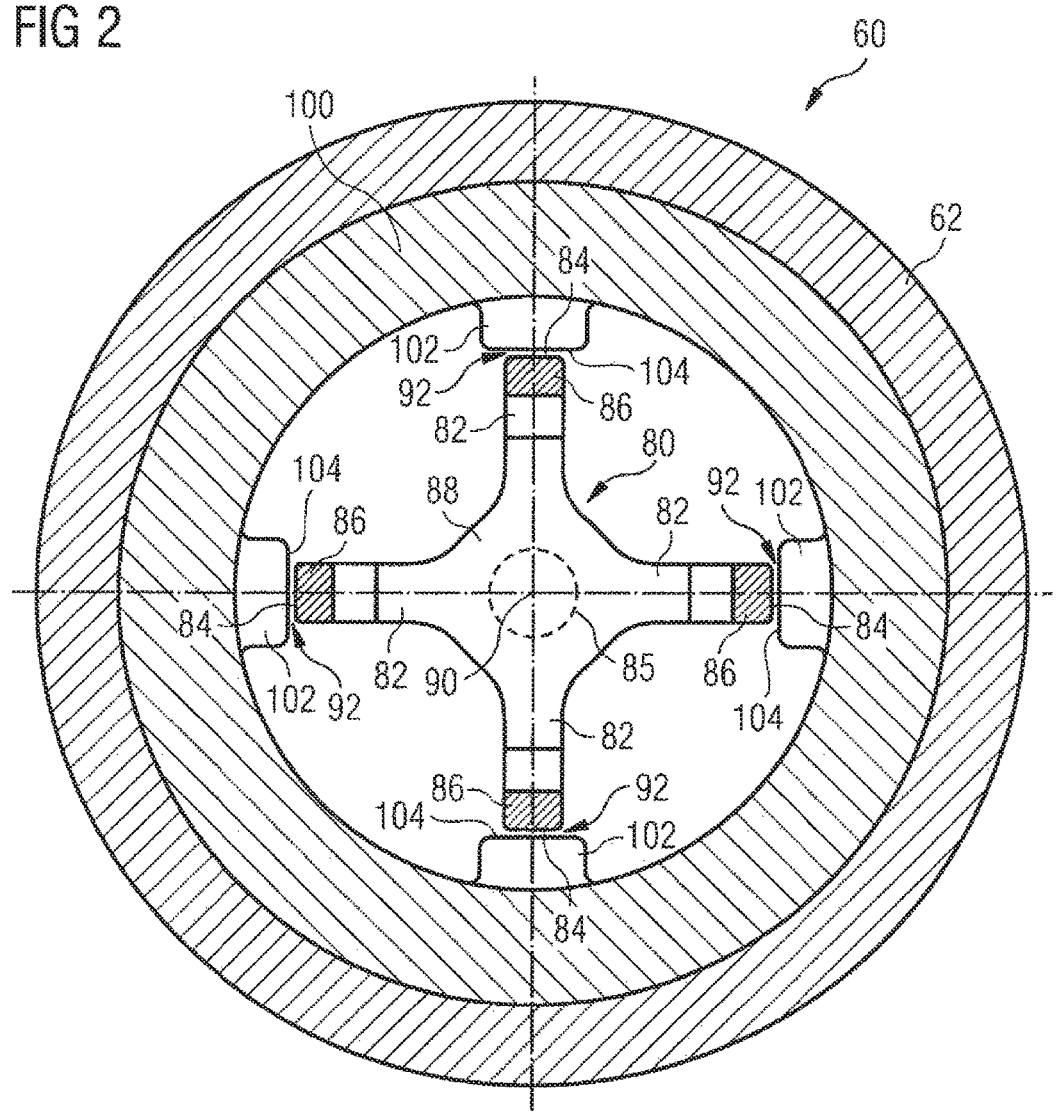
FIG. 2 is a cut view taken along line II-II of FIG. 1.

Referring to FIG. 2, a cut view taken along line II-II of FIG. 1 is illustrated. As can be seen in FIG. 2, the distal end portions 86 of the electrode arms 82 are disposed on a circle extending about the longitudinal axis 90 and are equidistantly spaced apart from one another. Similarly, the mass element 100 includes four mass protrusions 102 disposed about the inner circumference of the substantially annular mass element 100 and equidistantly spaced apart from one another. Each mass protrusion 102 protrudes radially inward towards an associated electrode arm 82 with the spark gap 92 formed therebetween.

For example, the spark gap 92 may be in a range from about 0.1 mm to about 2.0 mm, preferably in a range from about 0.2 mm to about 0.8 mm.

In the embodiment shown in FIG. 1, each mass protrusion 102 includes a radial inner face 104 facing an associated electrode arm 82. Each electrode arm 82 includes a radial outer face 84 facing the associated mass protrusion 102 with the spark gap 92 formed therebetween. As shown in FIG. 2, the electrode arms 82 each have a substantially rectangular cross-section. Thus, the radial outer faces 84 of the electrode arms 82 are substantially planar. However, in some embodiments, the electrode arms 82 may have any suitable cross-section, such as, for instance, a circular cross-section, an oval cross-section, or a triangular cross-section.

Each mass protrusion 102 is configured to have an extension in a circumferential direction equal to or greater than an extension in a circumferential direction of the associated electrode arm 82. That is the radial inner face 104 of the mass protrusion 102 is substantially greater than the radial outer face 84 of the associated electrode arm 82.

Figure 3:
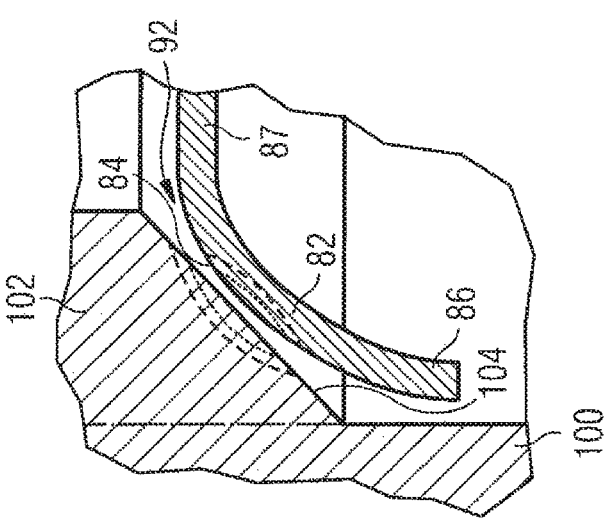
FIG. 3 is a cut view showing an exemplary disclosed embodiment of the mass element of FIG. 1.
Figure 4:
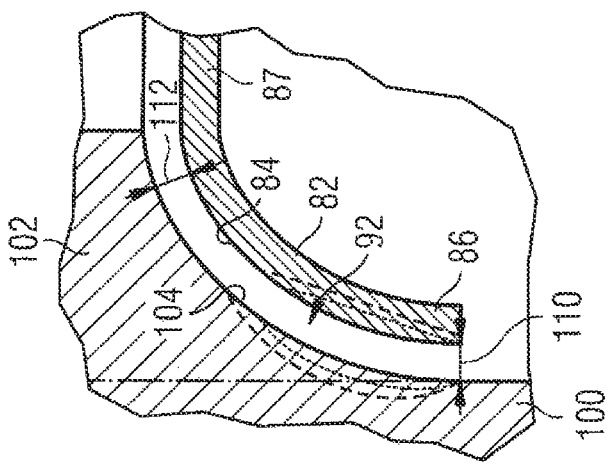
FIG. 4 is a cut view showing a further exemplary disclosed embodiment of the mass element.
Figure 5:
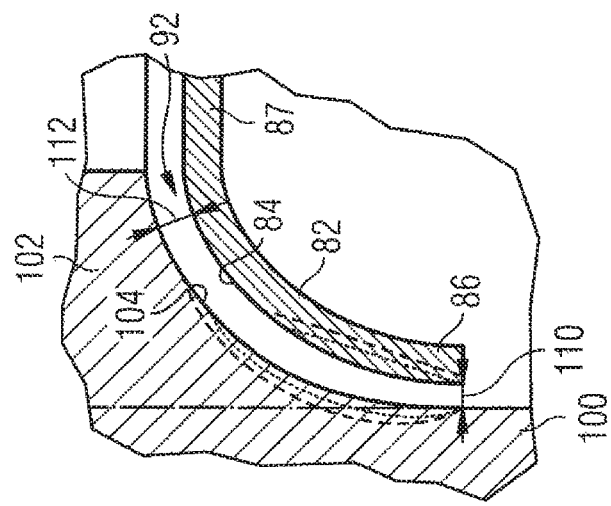
FIG. 5 is a cut view showing a further exemplary disclosed embodiment of the mass element.

Referring to FIGS. 3 to 5, exemplary shapes of a mass protrusion 102 are illustrated in greater detail. In each of FIGS. 3 to 5, for the sake of illustration, the electrode arm 82 is considered to be substantially circular-like bent. However, the electrode arm 82 may have a substantially straight shape and may extend along the longitudinal axis 91 (see FIG. 1).

As shown in FIG. 3, the radial inner face 104 of the mass protrusion 102 is substantially planar and inclined with respect to the longitudinal axis 90. Thus, with the bent electrode arm 82, the spark gap 92 is smallest at a middle portion of the electrode arm 82 and the mass protrusion 102, and increases in both directions, i.e. in the direction of the distal end portion 86 of the electrode arm 82 and in the direction of the proximal end portion 87 of the electrode arm 82. However, within the meaning of the present disclosure, the radial inner face 104 of the mass protrusions 102 is considered to substantially correspond to the radial outer face 84 of the electrode arm 82.

Referring to FIG. 4, a further exemplary shape of the radial inner face 104 is shown. The radial inner face 104 has a first distance 110 to the distal end portion 86 of the electrode arm 82 and a second distance 112 to the proximal end portion 87 of the electrode arm 82. In FIG. 4, the first distance 110 is equal to the second distance 112, such that the spark gap 92 between the radial inner face 104 and the radial outer face 84 is substantially uniform. For example, the radius of curvature of the radial outer face 84 of the electrode arm 82 may be substantially equal to the radius of curvature of the radial inner face 104 of the mass protrusion 102, with an offset of both elements.

To the contrary, regarding FIG. 5, the first distance 110 is smaller than the second distance 112. This may further ensure that sparks are preferably generated at the distal end portions 86 of the electrode arms 82, such that the electrode arm 82 is worn from the distal end portion 86 to the proximal end portion 87. For instance, the radius of curvature of the radial outer face 84 of the electrode arm 82 may be unequal to the radius of curvature of the radial inner face 104 of the mass protrusion 102.

In FIGS. 3 to 5, exemplary and qualitative wear lines of the electrode arm 82 and the mass protrusion 102 are illustrated in dotted lines and dashed lines, respectively. In FIGS. 3 to 5, the dotted lines illustrate the shape of the radial inner face 104 and the shape of the radial outer face 84 after a first operation time of the pre-chamber assembly, whereas the dashed lines illustrate the shape of the radial inner face 104 and the shape of the radial outer face 84 after a second operation time of the pre-chamber assembly 60, with the first operation time being smaller than the second operation time.

As can be seen in FIG. 3, and as mentioned above, sparks may be generated at a middle portion of the electrode arm 82 and of the mass protrusion 102 leading to wear at said middle locations, respectively (see dotted lines in FIG. 3).

After the second operation time, the wear may increase and may form respective recesses at the electrode arm 82 and the mass protrusion 102, respectively (see dashed lines in FIG. 3). Hence, the electrode arm 82 may be ablated from the middle portion toward both the distal end portion 86 and the proximal end portion 87.

With respect to FIG. 6, a further exemplary disclosed pre-chamber assembly 60 is shown. The pre-chamber assembly 60 of FIG. 6 is substantially identical to the pre-chamber assembly 60 of FIG. 1, and differs in that the mass element 100 is integrally formed with the pre-chamber cap 70. Specifically, the pre-chamber cap 70 includes a connecting portion 76 (indicated in two-dot-dashed lines in FIG. 6) for connecting to the mass element 100.

INDUSTRIAL APPLICABILITY

In the following, mounting of the mass ring 100 to the pre-chamber main body 62 is described with respect to FIG. 1, with the ignition electrode 80 already mounted to the pre-chamber main body 62.

First, the mass element 100 is inserted into the receiving portion 65 of the pre-chamber main body 62. Then, when approaching the ignition electrode 80, particularly the electrode arms 82, the mass element 100 is, due to the mass protrusions 102 having radial inner faces 104 being inclined with respect to the longitudinal axis 90, rotated until the mass protrusions 102 can pass by the electrode arms 82 (see FIG. 2). In particular, the mass protrusions 102 are rotated such that the electrode arms 82 pass through the circumferential gaps provided between two mass protrusions 102 circumferentially disposed next to one another.

When reaching the final mounting position, the mass element 100 is rotated again until each mass protrusion 102 directly faces an associated electrode arm 82, i.e. each radial inner face 104 faces an associated radial outer face 84 (see FIG. 2). Then, in said final assembly position, the mass element 100 is, for instance, laser beam welded to the pre-chamber main body 62. Particularly, the laser beam weld is a circular weld extending about the longitudinal axis 90.

In a final assembly step of the pre-chamber assembly 60, the pre-chamber cap 70 is fixed to the pre-chamber main body 62 by, for example, welding.

With respect to the embodiment shown in FIG. 6, assembly of the pre-chamber cap 70 including the mass element 100 to the pre-chamber main body 62 is substantially identical to the assembly of the mass element 100, but without the need of an additional weld attaching the mass element 100 to the pre-chamber main body 62.

In some embodiments, for supporting generating a spark between the radial inner faces 104 and the radial outer faces 84, and for reducing wear of the mass protrusions, the radial inner faces 104 may be coated with, for instance, Iridium.

Although the preferred embodiments of this invention have been described herein, improvements and modifications may be incorporated without departing from the scope of the following claims.

The invention claimed is:

1. A pre-chamber assembly for an internal combustion engine, comprising:
    a pre-chamber main body configured to be mounted to the internal combustion engine and defining at least a portion of a pre-chamber extending along a longitudinal axis;
    an ignition electrode including a center electrode and at least one electrode arm extending from the center electrode at least partially into the pre-chamber, the at least one electrode arm extending in both a radial direction with respect to the longitudinal axis and an axial direction with respect to the longitudinal axis; and
    a mass element including at least one radial inner face facing the at least one electrode arm, the at least one radial inner face being substantially non-parallel with respect to the longitudinal axis.

2. The pre-chamber assembly of claim 1, wherein the mass element circumferentially extends about the at least one electrode arm.

3. The pre-chamber assembly of claim 1, wherein the mass element includes at least one mass protrusion extending towards the at least one electrode arm, the at least one mass protrusion including the at least one radial inner face.

4. The pre-chamber assembly of claim 1, wherein the at least one electrode arm includes a radial outer face with respect to the longitudinal axis, the at least one radial inner face of the mass element facing the radial outer face of the at least one electrode arm.

5. The pre-chamber assembly of claim 1, wherein a spark gap is formed between the at least one radial inner face of the mass element and the at least one electrode arm, the spark gap being substantially constant along the axial direction with respect to the longitudinal axis.

6. The pre-chamber assembly of claim 1, wherein a spark gap is formed between the at least one radial inner face of the mass element and the at least one electrode arm, the spark gap being variable in the axial direction with respect to the longitudinal axis.

7. The pre-chamber assembly of claim 6, wherein a first distance of the spark gap at a distal end portion of the at least one electrode arm is smaller than a second distance of the spark gap at a proximal end portion of the at least one electrode arm.

8. The pre-chamber assembly of claim 5, wherein the spark gap is in a range from about 0.2 mm to about 2.0 mm.

9. The pre-chamber assembly of claim 1, wherein the at least one radial inner face of the mass element is substantially planar.

10. The pre-chamber assembly of claim 9, wherein the at least one radial inner face of the mass element is inclined with respect to the longitudinal axis with an angle ($\alpha$) being in a range from about 1° to about 20°.

11. The pre-chamber assembly of claim 1, wherein the at least one radial inner face of the mass element is substantially curved.

12. The pre-chamber assembly of claim 1, wherein the mass element is an annular mass ring having an axial extension substantially corresponding to an axial extension of the at least one electrode arm.

13. The pre-chamber assembly of claim 1, further comprising a pre-chamber cap mounted to the pre-chamber main body and defining a remaining portion of the pre-chamber.

14. The pre-chamber assembly of claim 13, wherein the pre-chamber cap is integrally formed with the mass element.

15. The pre-chamber assembly of claim 1, wherein the at least one electrode arm is made of one of Iridium, Platinum, Osmium, or any alloys thereof.

16. An engine, comprising:
    at least one cylinder;
    a cylinder head covering the at least one cylinder; and
    a pre-chamber assembly disposed in the cylinder head, the pre-chamber assembly including:
        a pre-chamber main body defining at least a portion of a pre-chamber extending along a longitudinal axis;

a pre-chamber cap attached to the pre-chamber main body, the pre-chamber main body and the pre-chamber cap forming the pre-chamber;

an ignition electrode including:
   a center electrode; and
   at least one electrode arm extending from the center electrode at least partially into the pre-chamber, the at least one electrode arm extending in both a radial direction with respect to the longitudinal axis and an axial direction with respect to the longitudinal axis; and a mass element including at least one radial inner face facing the at least one electrode arm, the at least one radial inner face being substantially non-parallel with respect to the longitudinal axis.

17. The engine of claim 16, wherein the mass element includes at least one mass protrusion extending towards the at least one electrode arm, the at least one mass protrusion including the at least one radial inner face.

18. The engine of claim 16, wherein the at least one electrode arm includes a radial outer face with respect to the longitudinal axis, the at least one radial inner face of the mass element facing the radial outer face of the at least one electrode arm.

19. The engine of claim 16, wherein a spark gap is formed between the at least one radial inner face of the mass element and the at least one electrode arm.

20. The engine of claim 19, wherein a first distance of the spark gap at a distal end portion of the at least one electrode arm is smaller than a second distance of the spark gap at a proximal end portion of the at least one electrode arm.

* * * * *